(12) United States Patent
McEncroe

(10) Patent No.: US 11,261,116 B2
(45) Date of Patent: Mar. 1, 2022

(54) FLUID TREATMENT SYSTEM

(71) Applicant: John James McEncroe, Golden, CO (US)

(72) Inventor: John James McEncroe, Golden, CO (US)

(*) Notice: Subject to any disclaimer, the term of this patent is extended or adjusted under 35 U.S.C. 154(b) by 0 days.

(21) Appl. No.: 17/469,639

(22) Filed: Sep. 8, 2021

(65) Prior Publication Data

US 2022/0002177 A1 Jan. 6, 2022

Related U.S. Application Data

(63) Continuation-in-part of application No. 17/002,778, filed on Aug. 26, 2020, now abandoned, which is a continuation-in-part of application No. 15/908,810, filed on Mar. 1, 2018, now abandoned, which is a continuation-in-part of application No. 13/998,189, filed on Oct. 3, 2013, now abandoned, which is a
(Continued)

(51) Int. Cl.
| | |
|---|---|
| *C02F 9/00* | (2006.01) |
| *C02F 1/00* | (2006.01) |
| *C02F 1/28* | (2006.01) |
| *C02F 1/44* | (2006.01) |
| *C02F 1/32* | (2006.01) |

(52) U.S. Cl.
CPC .............. *C02F 9/005* (2013.01); *C02F 1/003* (2013.01); *C02F 1/283* (2013.01); *C02F 1/32* (2013.01); *C02F 1/444* (2013.01); *C02F 2307/10* (2013.01); *Y02A 20/208* (2018.01)

(58) Field of Classification Search
CPC .......... C02F 1/001; C02F 1/003; C02F 1/008; C02F 1/283; C02F 1/32; C02F 1/42; C02F 1/444; C02F 1/76; C02F 2209/005; C02F 2209/40; C02F 2209/42; C02F 2209/44; C02F 2301/08; C02F 2303/04; C02F 2303/185; C02F 9/00; C02F 9/005; C02F 2307/10
See application file for complete search history.

(56) References Cited

U.S. PATENT DOCUMENTS 4,724,079 A * 2/1988 Sale ....................... B01D 61/04
210/638
4,849,100 A * 7/1989 Papandrea .............. C02F 1/325
210/138

(Continued)

*Primary Examiner* — Terry K Cecil
(74) *Attorney, Agent, or Firm* — Roger A. Jackson

(57) ABSTRACT

A fluid treatment system for treating a fluid, the system including structure for moving a fluid therethrough the system, the structure for moving the fluid including a first inlet and a first outlet, further a primary fluid filter having a primary fluid filter inlet and a primary fluid filter outlet, wherein the primary fluid filter inlet is in fluid communication with the first outlet. Included with the system is a primary ultraviolet light module having a primary ultraviolet light module inlet and a primary ultraviolet light module outlet, wherein the primary ultraviolet light module inlet is in fluid communication with the primary fluid filter outlet and a secondary fluid filter having a secondary fluid filter inlet and a secondary fluid filter outlet, wherein the secondary fluid filter inlet is in fluid communication with the primary ultraviolet light module outlet, wherein the secondary fluid filter outlet discharges a first treated fluid.

13 Claims, 11 Drawing Sheets

Related U.S. Application Data continuation of application No. 12/576,645, filed on Oct. 9, 2009, now abandoned.

(56) References Cited

U.S. PATENT DOCUMENTS

| | | | | | |
|---|---|---|---|---|---|
| 5,017,284 | A | * | 5/1991 | Miler | B01D 61/08 |
| | | | | | 210/97 |
| 5,512,178 | A | * | 4/1996 | Dempo | A61L 2/202 |
| | | | | | 210/638 |
| 5,536,395 | A | * | 7/1996 | Kuennen | C02F 1/283 |
| | | | | | 210/87 |
| 6,099,735 | A | * | 8/2000 | Kelada | B01D 61/08 |
| | | | | | 210/134 |
| 6,863,827 | B2 | * | 3/2005 | Saraceno | C02F 9/005 |
| | | | | | 210/748.11 |
| 6,936,176 | B1 | * | 8/2005 | Greene III | C02F 9/005 |
| | | | | | 210/205 |

* cited by examiner

FLUID TREATMENT SYSTEM

RELATED APPLICATIONS

This application is a continuation in part of U.S. patent application Ser. No. 17/002,778 filed on Aug. 26, 2020 by John James McEncroe of Golden, Colo., U.S., that is a continuation in part of U.S. patent application Ser. No. 15/908,810 filed on Mar. 1, 2018 by John James McEncroe of Golden, Colo., U.S., that is a continuation in part of U.S. patent application Ser. No. 13/998,189 filed on Oct. 3, 2013 by John James McEncroe of Golden, Colo., U.S., that is a continuation application of U.S. patent application Ser. No. 12/576,645 filed on Oct. 9, 2009 by John James McEncroe of Golden, Colo., U.S.

FIELD OF THE INVENTION

The present invention is generally related to water treatment systems and more particularly to household use self-contained water treatment systems for producing potable water from either compromised municipal water supplies or other non-potable water sources.

DESCRIPTION OF THE RELATED ART

In U.S. Pat. No. 7,632,410 to Heiss, disclosed is a portable universal water purification system that includes a method for producing safe drinking water from any water source, wherein the main goal is to minimize the maintenance required from contamination of water treatment components that include particle barriers, reverse osmosis membranes (RO), ultraviolet light (UV), hydrocarbon absorbent media, chlorine, ozonation, as the typical water purification components, via using water pressure and flow monitoring that can determine when to backflush filters, the UV light has a wiping device to keep the light transmission levels high, while using oxidation after RO to destroy organic compounds as opposed to self-exhausting filter media, finally ozonation and chlorine are used as residual disinfectant.

In U.S. Pat. No. 6,863,827 to Saraceno, disclosed is a solar powered portable water purifier that includes multiple water filters and an ultraviolet light (UV) wherein purified water is discharged, compared to many water treatment systems, Saraceno has minimal components (i.e. a single UV treatment) that would limit the degree of contaminated water that the Saraceno unit could handle.

What is needed is a fluid treatment system that employs existing technologies to economically produce potable water in a configuration which provides the requisite flexibility for everyday use in the home, portable use away from home, and during civil potable water supply emergencies. Unlike bottled water which is processed in a controlled environment and subsequently distributed in tamper evident packaging (and which may be unavailable during civil emergencies when most needed), municipally treated water is pumped through a complicated water distribution system in which there are numerous potential places for contamination and which are not under the direct control of the water supplier. Indeed, one study found that 30.3% of waterborne disease outbreaks in the United States could be traced to our treated water distribution systems (Craun & Calderon 2001).

The present invention process can help eliminate outbreaks related to distribution system contamination events. In addition to concerns with contamination of treated water within municipal water distribution systems, there are trace amounts of human made chemicals, such as endocrine disrupting compounds, which are routinely detected in the treated water leaving our municipal drinking water plants. Until relatively recent advances in laboratory analysis capabilities, the presence of trace amounts of many of these chemicals was immeasurable. Dr. Joerg Drewes (formerly at Colorado School of Mines and now at the University of Munich) stated his concern about these chemicals as follows: In addition to concerns about individual endocrine disrupting compounds, there is concern about the cocktail effect of numerous micropollutants and/or their metabolites (lecture notes from ESGN 603 at Colorado School of Mines, Sep. 9, 2004). Indeed, there are over 83,000 chemicals currently in the Toxic Substances Control Act (TSCA) inventory (testimony before the Subcommittee on Commerce, Trade, and Consumer Protection, Committee on Energy, and Commerce, House of Representatives by John Stephenson, Director Natural Resources and the Environment GAO, Feb. 26, 2009, GAO-09-428T Chemical Regulation, Options for Enhancing the Effectiveness of TSCA). The regulatory community and municipal water industry are at a crossroads. At an enormous cost, we can remove these trace contaminants using centralized municipal water treatment, but does it make sense to do so when less than 1% of our municipal water supply is ingested (Vickers 2001), and when we know that about ⅓ of disease outbreaks attributable to our potable water systems can be traced to our water distribution systems, the problem needs attention. Although bottled water is generally free of endocrine disrupting compounds and of high microbial purity, as stated before it may be unavailable during civil emergencies when it is most needed. The present invention being a self-contained countertop or under counter (portable) water treatment system, see FIG. 11 for example, wherein the water treatment system uses 4 stages of filtration, and/or adsorption, and/or ion exchange, coupled with 2 stages of UV disinfection, to reliably and economically address these exposures.

The present invention fluid/water treatment system is a logical, economical, and effective, addition to the water industry's traditional "multiple barrier" treatment strategy. Although there are numerous manufacturers of "Point-of-Use" water treatment systems, to be successful in persuading the EPA, state and local Health Departments, and municipal water suppliers to approve and employ a "Point-of-Use" system they need a free-standing smaller self-contained countertop or under counter design which: Eliminates the nebulous variables and costs related to under-the-counter installations; is convenient and easy for the user to operate and have the utility to swap out on a scheduled basis (generally every six months, but variable depending on water system quality); and which provides potable water by protecting the user against microbiological, inorganic, and organic contaminants, again see FIG. 11 for an example. Although reverse osmosis (RO) systems provide a high degree of purity, healthful minerals are removed from the water and a liquid waste stream is generated which must be disposed of (typically by a connection to a drain), this is why the present invention does not employ RO, thus the present invention will not remove these beneficial constituents nor will it generate a liquid waste stream.

To ensure the provision of potable water, the present invention employs typically but not limited to the following physical treatment steps including:
  1. Filtration at <50 micrometer (um);
  2. Ultraviolet $1^{st}$ (UV) disinfection;
  3. Additional filtration that could include Granular Activated Carbon (GAC) adsorption;

4. Ion exchange cartridges at <3 um (inclusion of a filtration cartridge at <0.45 um will physically exclude pathogenic bacteria);
5. Ultraviolet $2^{nd}$ (UV) disinfection following filtration/adsorption/ion exchange to ensure that any pathogens passing through, or surviving, the prior physical treatment steps are inactivated. One of the biggest drawbacks of water treatment systems that use carbon adsorption for organics (and chlorine) removal is that there is no method supplied with any system to determine the efficacy of the adsorption system. It is quite possible that subsequent to a serious distribution system event, the user would mistakenly believe that adsorption is occurring, when in fact the carbon's adsorption ability has been seriously compromised or otherwise exhausted. As such, a generic chlorine disinfectant residual test kit should be included as part of the system.

The vast majority of the time there will be a chlorine residual in the influent to the system from a municipal water treatment system and no residual in the treated water from the present invention system (which would indicate effective adsorption). In the event of the failure of the UV disinfection process, specific instructions should be included on how to add chlorine bleach (a common household disinfectant) to the filtered water are included with the present invention system (the generic chlorine residual test kit can be used to determine if an adequate amount of chlorine has been added). Additionally, even if the UV system is working, if a boil water order has been placed by the state or local health department (or during a civil emergency) the chlorine bleach addition instructions will provide peace of mind for the user who wants additional assurance that the water from the present invention system is potable. In the event of pump failure, a syringe is provided so that potable water can be obtained by manually pumping/forcing water through the present invention system.

SUMMARY OF INVENTION

Broadly, the present invention is a fluid treatment system for treating a fluid, the fluid treatment system including a means for moving a fluid therethrough the fluid treatment system, the means for moving a fluid including a first inlet and a first outlet, further a primary fluid filter having a primary fluid filter inlet and a primary fluid filter outlet, wherein the primary fluid filter inlet is in fluid communication with the first outlet. Further included with the fluid treatment system is a primary ultraviolet light module having a primary ultraviolet light module inlet and a primary ultraviolet light module outlet, wherein the primary ultraviolet light module inlet is in fluid communication with the primary fluid filter outlet and a secondary fluid filter having a secondary fluid filter inlet and a secondary fluid filter outlet, wherein the secondary fluid filter inlet is in fluid communication with the primary ultraviolet light module outlet, wherein the secondary fluid filter outlet discharges a first treated fluid.

These and other objects of the present invention will become more readily appreciated and understood from a consideration of the following detailed description of the exemplary embodiments of the present invention when taken together with the accompanying drawings, in which;

BRIEF DESCRIPTION OF DRAWINGS

FIG. 10 shows cross section view 10-10 from FIG. 7, wherein FIG. 10 shows the treated fluid reservoir containing the treated fluid, further shown is a fluid level control structure affixed to the surrounding sidewall of the treated fluid reservoir and further the fluid level control structure affixed to the closed channel fluid communication to the flanged in-line gate valved first aperture affixed therethrough the surrounding sidewall of the treated fluid reservoir.

REFERENCE NUMBERS IN DRAWINGS

Figure 1:
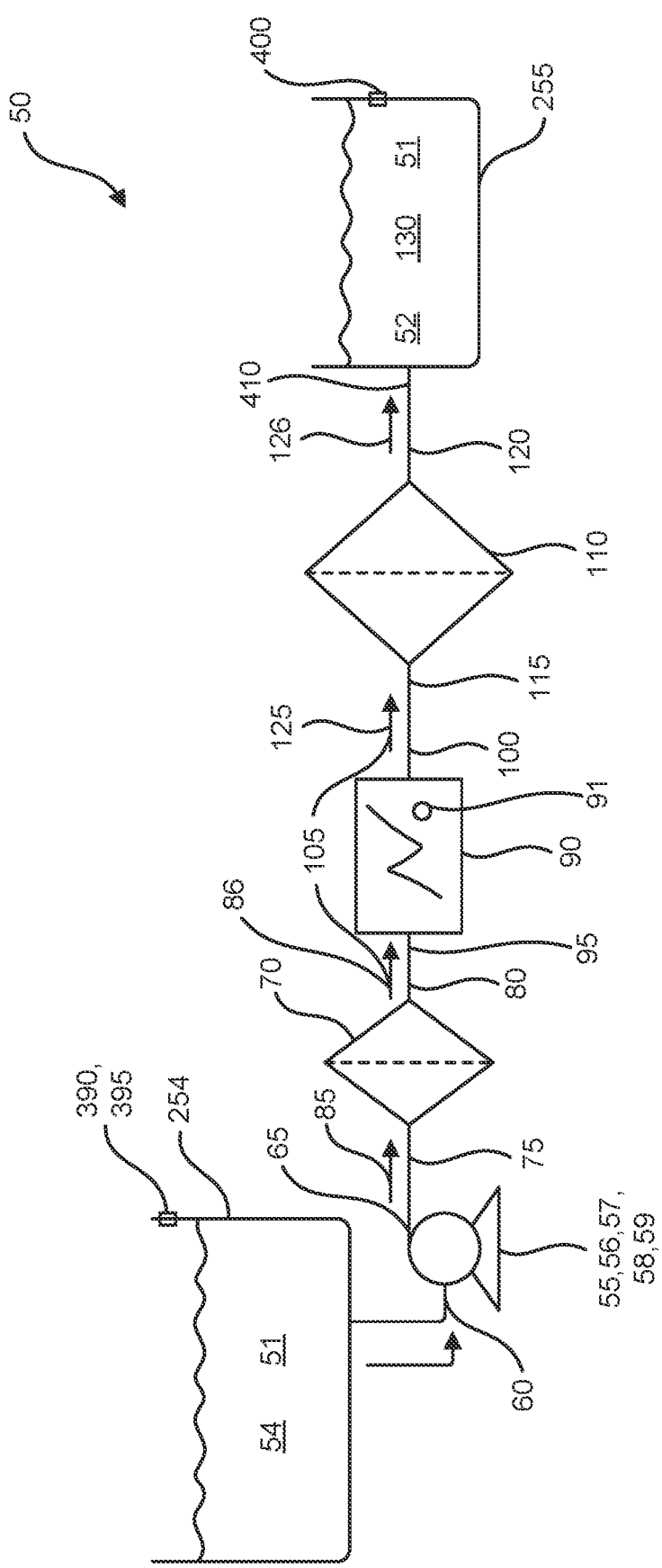
FIG. 1 shows schematic view of the fluid treatment system that includes the untreated fluid in the untreated reservoir communicating to the means for moving the fluid, a primary fluid filter, communicating to a primary ultralight module communicating to a secondary fluid filter that in turn communicates to a treated fluid reservoir containing the first treated fluid.

50 Fluid treatment system to include all disclosed versions of the fluid treatment system described herein
51 Fluid
52 Treated fluid
53 Second treated fluid
54 Untreated fluid
55 Means for moving the fluid 51 therethrough the fluid treatment system 50
56 Pump/motor combination for the means 55
57 Manual pumps for the means 55
58 Fluid treatment system 50 structural elevation differences for the means 55
59 Fluid treatment system 50 pressure differences for the means 55
60 First inlet for the means 55
65 First outlet for the means 55
70 Primary fluid filter
75 Fluid filter inlet of the primary fluid filter 70
80 Fluid filter outlet of the primary fluid filter 70
85 Fluid communication between the primary fluid filter inlet 75 and the first outlet 65
86 Fluid communication between the primary fluid filter 70 outlet 80 and the inlet 95 of the primary ultraviolet light module 90
90 Primary ultraviolet light module
91 Perceptible output of the primary ultraviolet light module 90
95 Inlet of the primary ultraviolet light module 90
100 Outlet of the primary ultraviolet light module 90
105 Fluid communication between the inlet 95 of the primary ultraviolet light module 90 and the outlet of the primary ultraviolet light module 90
110 Secondary fluid filter
115 Inlet of the secondary fluid filter 110
120 Outlet of the secondary fluid filter 110
125 Fluid communication between the secondary fluid filter inlet 115 and the outlet 100 of the primary ultraviolet light module 90
126 Fluid communication between the outlet 120 of the secondary fluid filter 110 to the inlet 410 of the treated fluid reservoir
130 First treated fluid
135 Tertiary fluid filter
140 Inlet of the tertiary fluid filter 135
145 Outlet of the tertiary fluid filter 135
150 Fluid communication between the tertiary fluid filter inlet 140 and the outlet 120 of the secondary fluid filter 110
155 Activated carbon absorption or other elements besides carbon absorption such as activated alumina absorption fluid filter, there can be instances where more than one activated carbon filter 155 would be utilized depending on the untreated fluid 54 contaminates
160 Inlet of the activated carbon absorption fluid filter 155
165 Outlet of the activated carbon absorption fluid filter 155
170 Fluid communication between the inlet 160 of the activated carbon absorption fluid filter 155 and the outlet 120 of the secondary fluid filter 110
175 Ion exchange fluid filter, there can be instances where more than one ion exchange filter 175 would be utilized depending on the untreated water 54 contaminates
180 Inlet of the ion exchange fluid filter 175
185 Outlet of the ion exchange fluid filter 175
190 Fluid communication between the inlet 180 of the ion exchange fluid filter 175 and the outlet 120 of the secondary fluid filter 110
195 Secondary ultraviolet light module, preferably the secondary ultraviolet light module 195 is downstream of all utilized fluid filter(s) 70, 110, 135, or 405, absorption filter(s) 155, and ion exchange filter(s) 175
196 Perceptible output of the secondary ultraviolet light module 195
200 Inlet of the secondary ultraviolet light module 195
205 Outlet of the secondary ultraviolet light module 195
210 Fluid communication between the inlet 200 of the secondary ultraviolet light module 195 and the outlet 145 of the tertiary fluid filter 135
215 Fluid communication between the inlet 200 of the secondary ultraviolet light module 195 and the outlet 165 of the activated carbon absorption fluid filter 155
220 Fluid communication between the inlet 200 of the secondary ultraviolet light module 195 and the outlet 185 of the ion exchange fluid filter 175
225 Control circuitry that effectuates a first selected time delay period 230 that activates the primary ultraviolet light module 90 for the first selected time delay period 230 prior to allowing activation of the means 55 for moving the fluid 51 therethrough the fluid treatment system 50, note in the case of both the primary 90 and secondary 195 ultraviolet light modules being utilized the control circuitry 225 will activate both the primary 90 and secondary 195 ultraviolet light modules prior to allowing activation of the means 55 for moving the fluid 51 therethrough the fluid treatment system 50
230 First selected time delay period
235 Second selected time delay period that deactivates the means 55 for moving the fluid therethrough the fluid treatment system 50 and the primary ultraviolet light module 90 subsequent to activation of the means 55 for moving a fluid 51 therethrough to limit the fluid treatment system 50 to a batch processing of the fluid, note in the case of both the primary 90 and secondary 195 ultraviolet light modules being utilized, the control circuitry 225 will deactivate both the primary 90 and secondary 195 ultraviolet light modules along with the means 55 for moving the fluid therethrough the fluid treatment system 50 therethrough to limit the fluid treatment system 50 to a batch processing of the fluid

240 Means for controlling a flow rate of the fluid 51

245 Fluid communication between the means 240 for controlling a flow rate of the fluid 51 and the first outlet 65 for the means 55

250 Dwell time of the fluid 51 being exposed to the primary ultraviolet light module 90

254 Reservoir for untreated fluid 54

255 Reservoir for treated fluids that includes the treated fluid reservoir 52, the second treated fluid reservoir 53, the first treated fluid reservoir 130, the third treated fluid reservoir 325, the fourth treated fluid reservoir 375, the fifth treated fluid reservoir 380, and the sixth treated fluid reservoir 385

256 Optional reservoir pressurized for untreated fluid 54

260 Fluid communication between the reservoir 255 and the outlet 120 of the secondary fluid filter 110

265 Fluid level control structure that can be a float level type, a pressure or differential pressure sensing type, an electronic type (radar, radio frequency, ultrasonic, and the like), load cell (based on treated fluid 52 weight differences), or any suitable equivalent

270 First aperture that is disposed or affixed within and therethrough the surrounding sidewall 280

271 Centerline of the first aperture 270

275 Selected fluid level in the reservoir 255 that applies to include; selected fluid level of treated fluid 52, second selected fluid level of second treated fluid 53, first selected fluid level of first treated fluid 130, third selected fluid level of third treated fluid 325, fourth selected fluid level of fourth treated fluid 375, fifth selected fluid level of fifth treated fluid 380, and the sixth selected fluid level of sixth treated fluid 385

Figure 7:
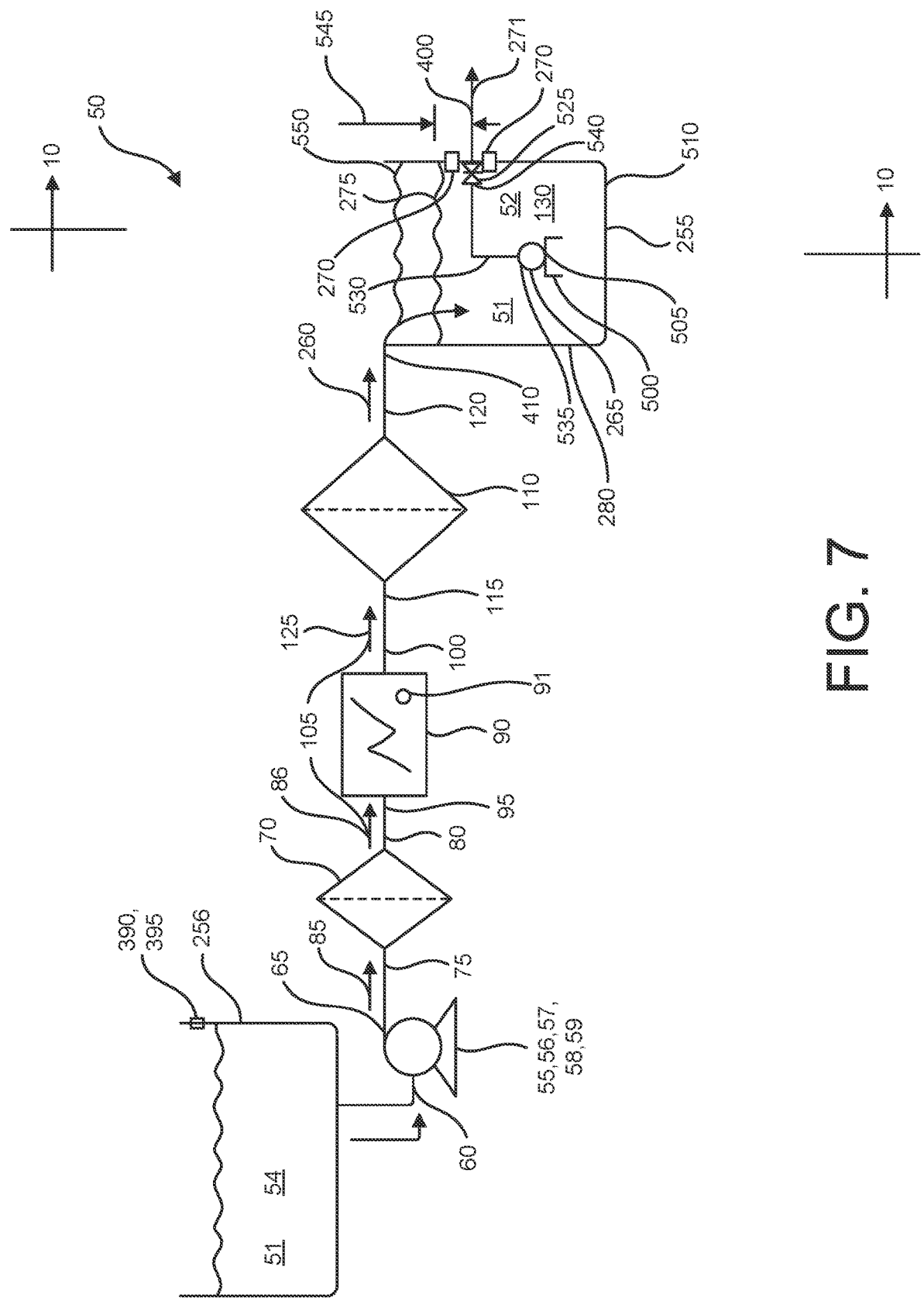
FIG. 7 shows schematic view of the fluid treatment system that includes the untreated fluid in the untreated reservoir communicating to the means for moving the fluid, a primary fluid filter, communicating to a primary ultralight module communicating to a secondary fluid filter that in turn communicates to a treated fluid reservoir containing the first treated fluid, further shown is a fluid level control structure with a first aperture.
Figure 10:
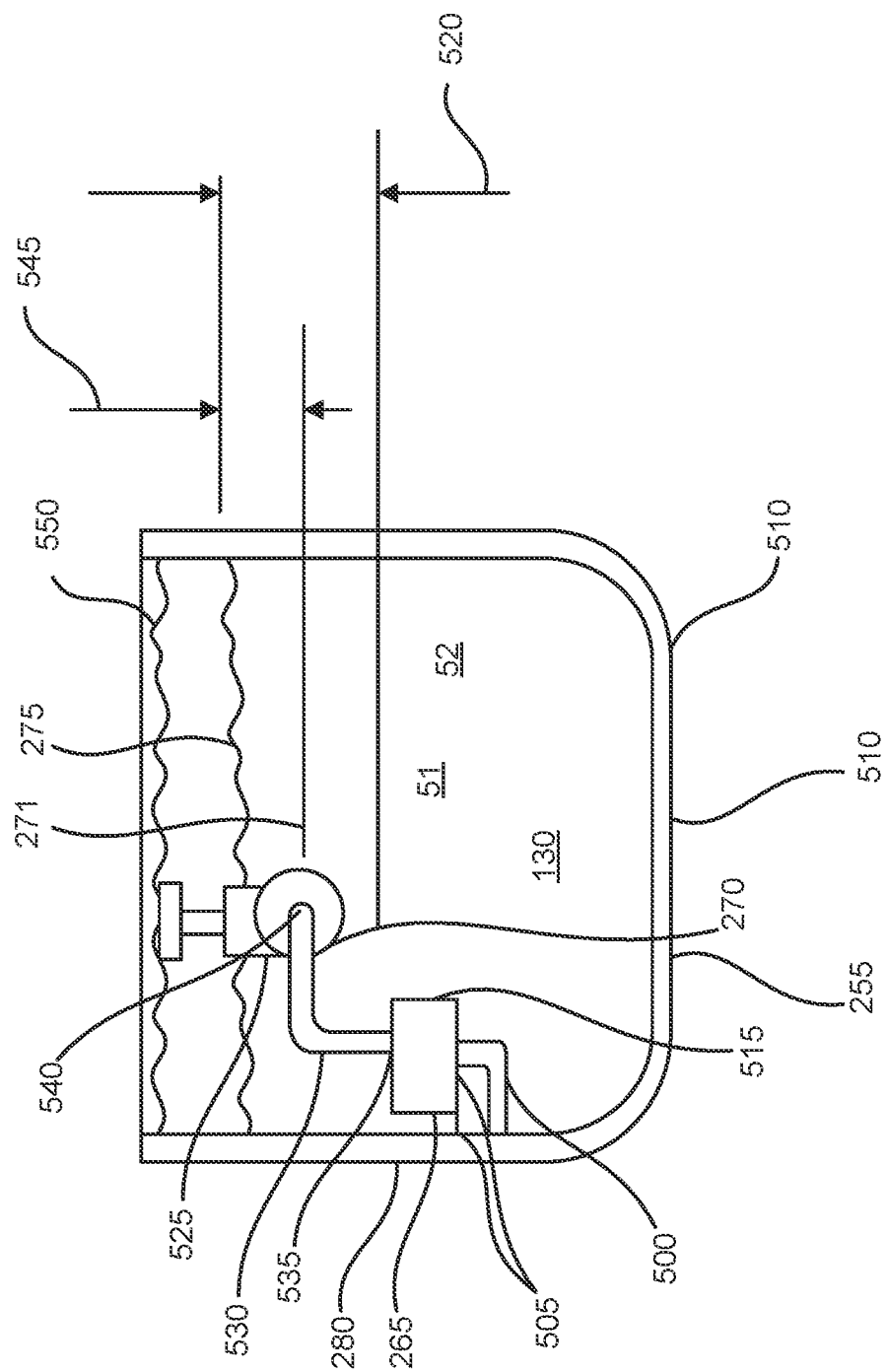

280 Surrounding sidewall of the reservoir 255 that is preferably vertical in position as shown in FIGS. 7 and 10

285 Fluid treatment system kit

290 Chlorine disinfectant residual test kit

295 Test strips for the chlorine disinfectant residual test kit

300 Instructions to test for an absence of chlorine in the second treated fluid 53 or third treated fluid 325 to confirm efficacy of the activated carbon absorption fluid filter 155, further instructions on setting the first time delay period 230 and the second time delay period 235

305 Bleach

310 Instructions to add, agitate, and have dwell time of additional chlorine from the bleach 305 to the second treated fluid 53 or third treated fluid 325 in the event of the primary ultraviolet light module 90 failure and/or secondary ultraviolet light module 195 failure, further using the chlorine disinfectant residual test kit 290 including the chlorine test strips 295 to test for a desired chlorine level in the second treated fluid 53 or third treated fluid 325 and repeating the instructions 310, thus additional chlorine must be added to ensure adequate disinfection by adding 1 ml (about 10 drops from a typical household eyedropper) of household bleach (typically about 5.250% available chlorine) to 2 gallons of water from the treated water tank 255, robustly stirring it, and letting the bleach react with the water for 15 minutes, the generic chorine disinfectant residual test kit can then be used to test the chlorine residual and a residual of 1-3 mg/l should be indicated, if it is below 0.5 mg/l, another 1 ml of bleach should be added, and the process repeated, as many times as it takes, until a residual of 1-3 mg/l is measured

315 Instructions to test the untreated fluid 54 and the second treated fluid 53 or third treated fluid 325 wherein the untreated fluid 54 is directed to the first inlet 60 for determining sizes and criterion of the primary 70, secondary 110, tertiary 135, and fourth 405 fluid filters, the primary 90 or secondary 195 ultraviolet light modules, the activated carbon absorption fluid filter 155, and/or ion exchange fluid filter 175, to meet the test instructions 300, 310 for the treated fluids 53, 130, 325, 375, 380, or 385

320 A method of treating a fluid

325 Third treated fluid

350 Power supply

355 Pressurized reservoir 254 for differential pressure 59 for means 55 for moving fluid 51 through the fluid treatment system 50

360 Elevation difference 58 for means 55 for moving fluid 51 through the fluid treatment system 50

365 Fluid communication from the outlet 165 of the activated carbon absorption fluid filter 155 to the inlet 140 of the tertiary fluid filter 135

370 Fluid communication from the outlet 145 of the tertiary fluid filter 135 to the inlet 180 of the ion exchange fluid filter 175

375 Fourth treated fluid

380 Fifth treated fluid

385 Sixth treated fluid

390 Optional connection for municipal water supply that can include a backflow preventor

395 Optional connection for sink faucet

400 Optional sink faucet connection, drain valve connection, or equivalent for the outlet of the treated fluid reservoir 255

Figure 2:
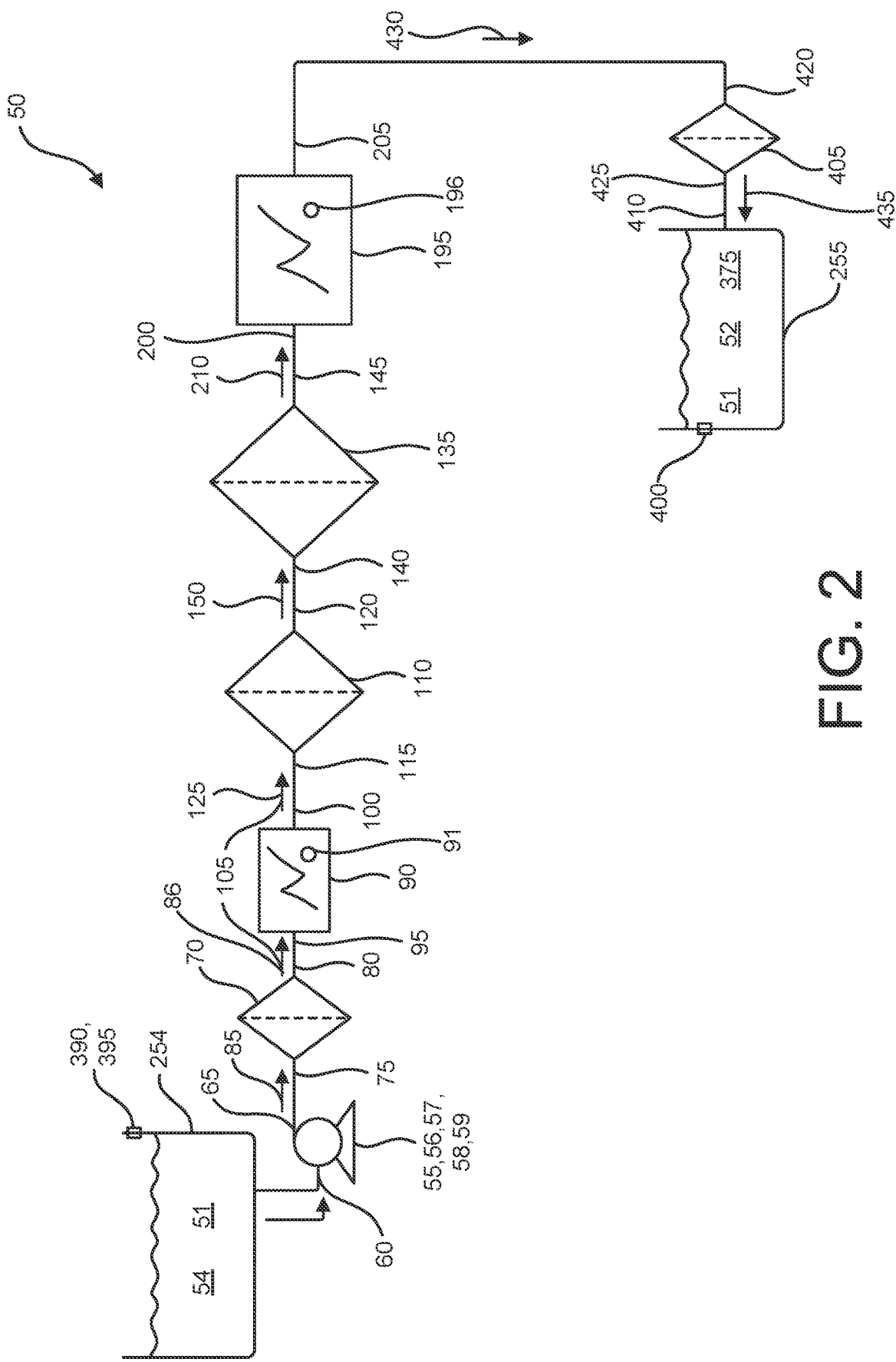
FIG. 2 shows schematic view of the fluid treatment system that includes the untreated fluid in the untreated reservoir communicating to the means for moving the fluid, a primary fluid filter, communicating to a primary ultralight module communicating to a secondary fluid filter, communicating to a tertiary fluid filter communicating to a secondary ultralight module that in turn communicates to a treated fluid reservoir containing the fourth treated fluid.

405 Fourth fluid filter although shown in FIG. 2, the fluid communication position of the fourth fluid filter 405 can be positioned upstream of the secondary ultraviolet light module 195

410 Inlet of the treated fluid reservoir 255

420 Inlet of the fourth fluid filter 405

425 Outlet of the fourth fluid filter 405

430 Fluid communication from the outlet 205 of the second ultraviolet light module 195 to the inlet 420 of the fourth fluid filter 405

435 Fluid communication from the outlet 425 of the fourth fluid filter 405 to the inlet 410 of the treated fluid reservoir 255

440 Fluid communication from the outlet 205 of the secondary ultraviolet light module 195 to the inlet 410 of the treated fluid reservoir 255

445 Fluid communication from the outlet 165 of the activated carbon absorption filter 155 to the inlet 410 of the treated fluid reservoir 255

500 C-channel structure mount for fluid level control structure 265 to the surrounding sidewall 280

505 Affixed manner of the fluid level control structure 265 to the surrounding sidewall 280 via the C-channel structure mount 500 that can be welded, bolted, riveted, attached with adhesive, or any suitable equivalent

510 Base of the surrounding sidewall 280

515 The submerged position below the selected fluid level 275 in the treated fluid reservoir 255

520 Submerged distance of the fluid level control structure 265 below the selected fluid level 275 resulting in the submerged position 515 below the selected fluid level 275 in the treated fluid reservoir 255

525 Flanged in-line gate valve that is disposed within the first aperture 270 noting that the flanged in-line gate valve 525 can be submerged as shown in FIG. 7 or partially submerged as shown in FIG. 10

530 Closed channel fluid communication that is preferably a fixed position pipe that facilitates fluid communication between the fluid level control structure 265 and the flanged in-line gate valve 525 that is disposed within the first aperture 270

535 Affixed connection between the fluid level control structure 265 and the closed channel fluid communication 530

540 Affixed connection between the flanged in-line gate valve 525 and the closed channel fluid communication 530

545 Distance that the first aperture 270 is positioned and submerged below the selected fluid level 275 based upon the first aperture 270 centerline 271

550 Maximum fluid 51, 52 level of the treated fluid reservoirs 255 that applies to include; maximum fluid level of treated fluid 52, second maximum fluid level of second treated fluid 53, first maximum fluid level of first treated fluid 130, third maximum fluid level of third treated fluid 325, fourth maximum fluid level of fourth treated fluid 375, fifth maximum fluid level of fifth treated fluid 380, and the sixth maximum fluid level of sixth treated fluid 385

555 Countertop

560 Under countertop

DETAILED DESCRIPTION

With initial reference to FIG. 1 shown is the schematic view of the fluid treatment system 50 that includes the untreated fluid 54 in the untreated reservoir 254 communicating to the means 55 for moving the fluid 51, a primary fluid filter 70, communicating 86 to a primary ultralight module 90 communicating 125 to a secondary fluid filter 110 that in turn communicates 126 to a treated fluid reservoir 255 containing a first treated fluid 130.

Further, FIG. 2 shows schematic view of the fluid treatment system 50 that includes the untreated fluid 54 in the untreated reservoir 254 communicating to the means 55 for moving the fluid 51, the primary fluid filter 70, communicating 86 to the primary ultralight module 90 communicating 125 to a secondary fluid filter 110, communicating 150 to a tertiary fluid filter 135 communicating 210 to a secondary ultralight module 195 that in turn communicates 430 to the treated fluid reservoir 255 containing a fourth treated fluid 375.

Figure 3:
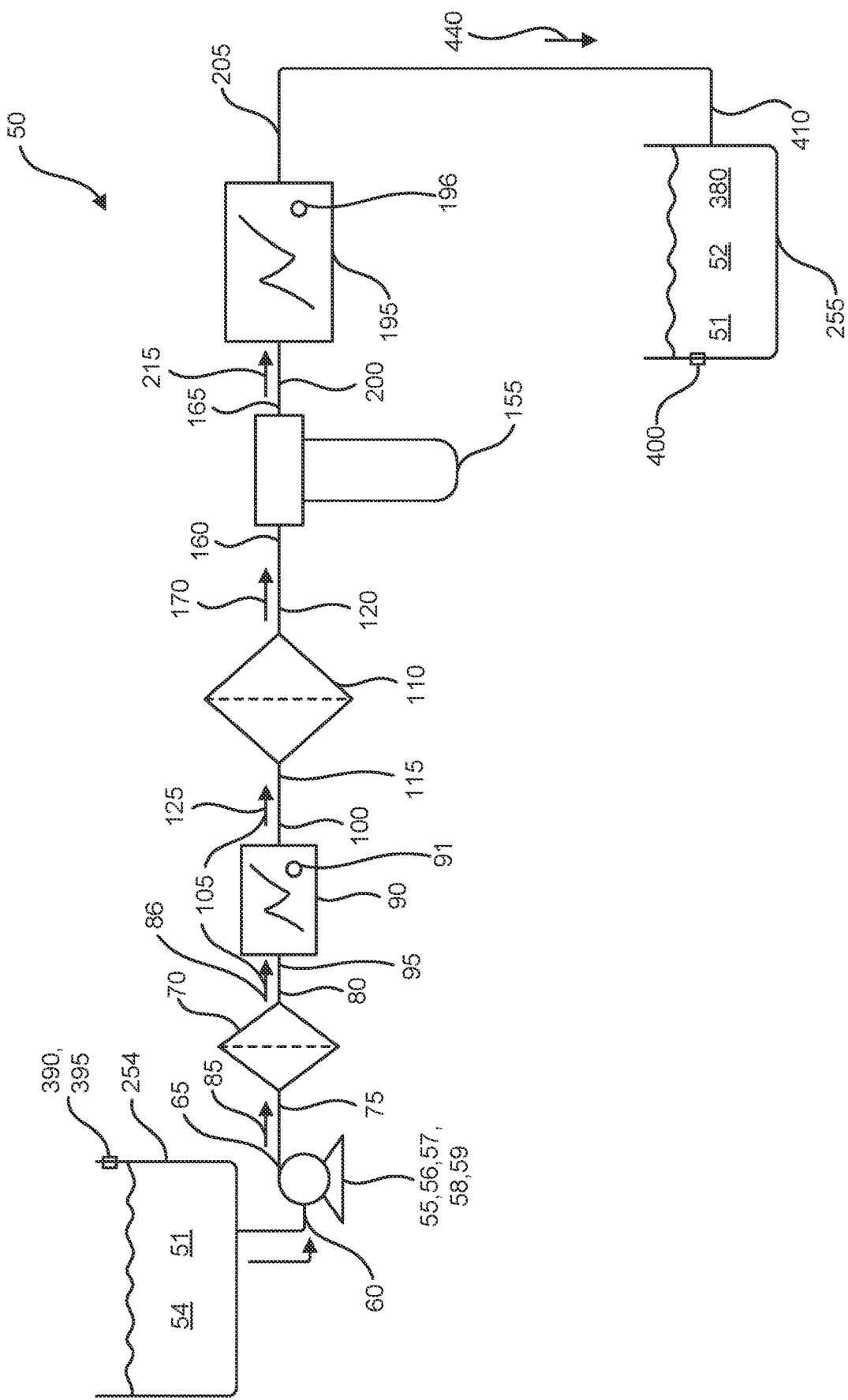
FIG. 3 shows schematic view of the fluid treatment system that includes the untreated fluid in the untreated reservoir communicating to the means for moving the fluid, a primary fluid filter, communicating to a primary ultralight module communicating to a secondary fluid filter, communicating to an activated charcoal filter communicating to a secondary ultralight module that in turn communicates to a treated fluid reservoir containing the fifth treated fluid.

Continuing, FIG. 3 shows schematic view of the fluid treatment system 50 that includes the untreated fluid 54 in the untreated reservoir 254 communicating to the means 55 for moving the fluid 51, the primary fluid filter 70, communicating 86 to the primary ultraviolet light module 90 communicating 125 to the secondary fluid filter 110, communicating 170 to an activated charcoal filter 155 communicating 215 to the secondary ultraviolet light module 195 that in turn communicates 440 to the treated fluid reservoir 255 containing a fifth treated fluid 380.

Figure 4:
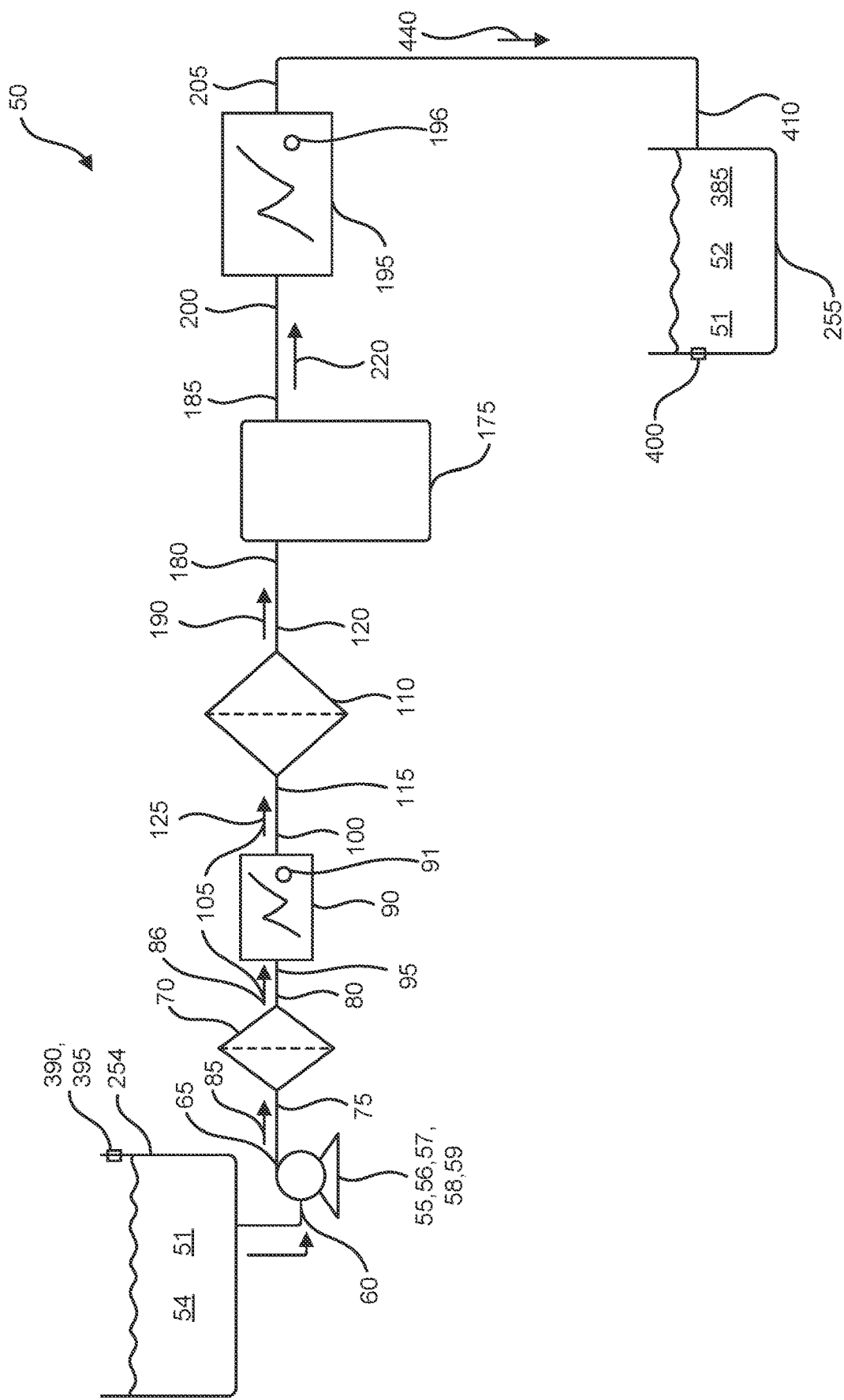
FIG. 4 shows schematic view of the fluid treatment system that includes the untreated fluid in the untreated reservoir communicating to the means for moving the fluid, a primary fluid filter, communicating to a primary ultralight module communicating to a secondary fluid filter, communicating to an ion exchange filter communicating to a secondary ultralight module that in turn communicates to a treated fluid reservoir containing the sixth treated fluid.

Next, FIG. 4 shows schematic view of the fluid treatment system 50 that includes the untreated fluid 54 in the untreated reservoir 254 communicating to the means 55 for moving the fluid 51, the primary fluid filter 70, communicating 86 to the primary ultralight module 90 communicating 125 to the secondary fluid filter 110, communicating 190 to an ion exchange filter 175 communicating 220 to the secondary ultralight module 195 that in turn communicates 440 to the treated fluid reservoir 255 containing a sixth treated fluid 385.

Figure 5:
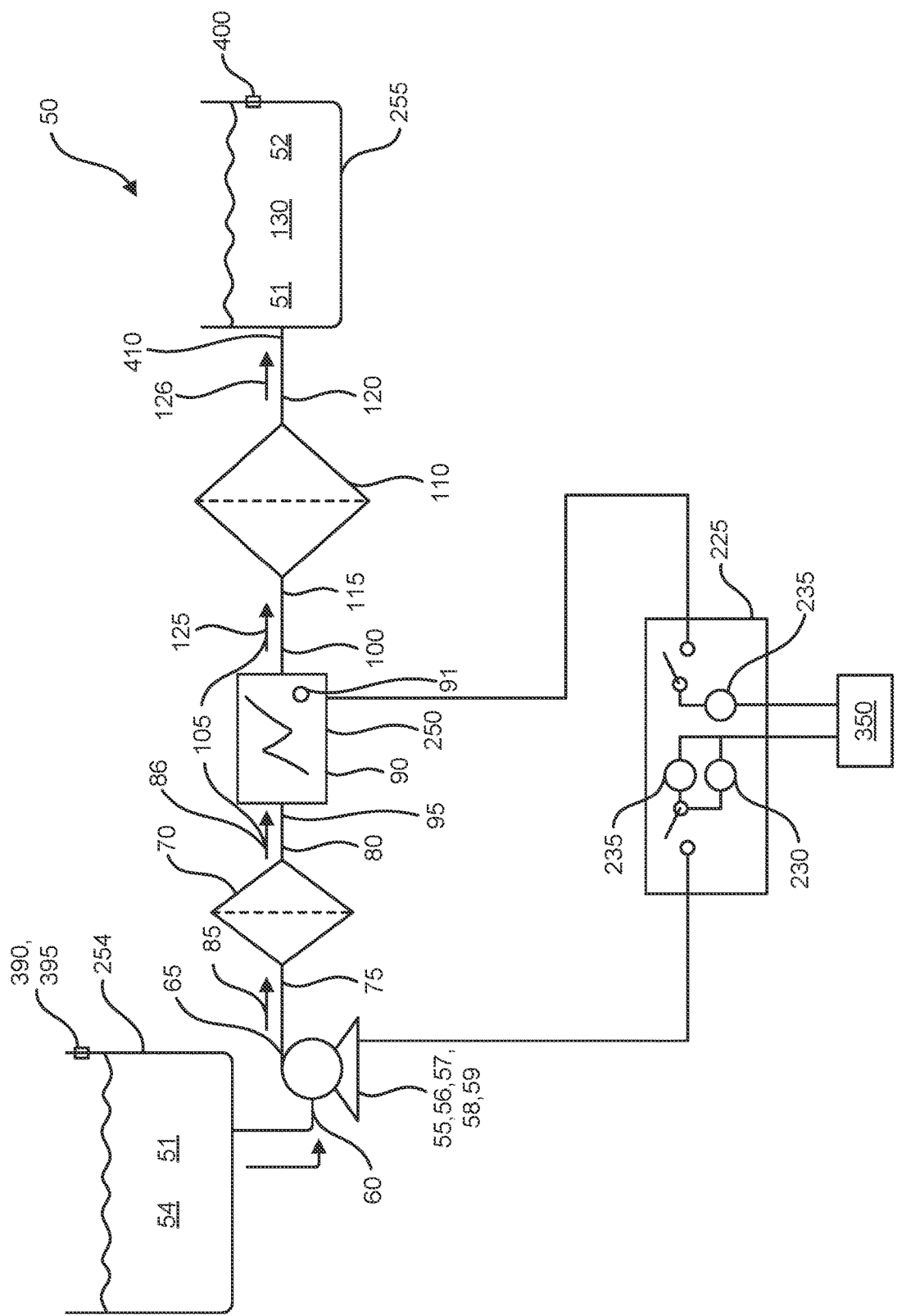
FIG. 5 shows schematic view of the fluid treatment system that includes the untreated fluid in the untreated reservoir communicating to the means for moving the fluid, a primary fluid filter, communicating to a primary ultralight module communicating to a secondary fluid filter that in turn communicates to a treated fluid reservoir containing the first treated fluid, further shown is control circuitry that effectuates a first selected time delay period that activate the primary ultraviolet light module prior to allowing activation of the means for moving the fluid.

Moving onward, FIG. 5 shows schematic view of the fluid treatment system 50 that includes the untreated fluid 54 in the untreated reservoir 254 communicating to the means 55 for moving the fluid 51, the primary fluid filter 70, communicating 86 to the primary ultralight module 90 communicating 125 to the secondary fluid filter 110 that in turn communicates 126 to the treated fluid reservoir 255 containing the first treated fluid 130, further shown is control circuitry 225 that effectuates a first selected time delay period 230 that activates the primary ultraviolet light module 90 prior to allowing activation of the means 55 for moving the fluid 51.

Figure 6:
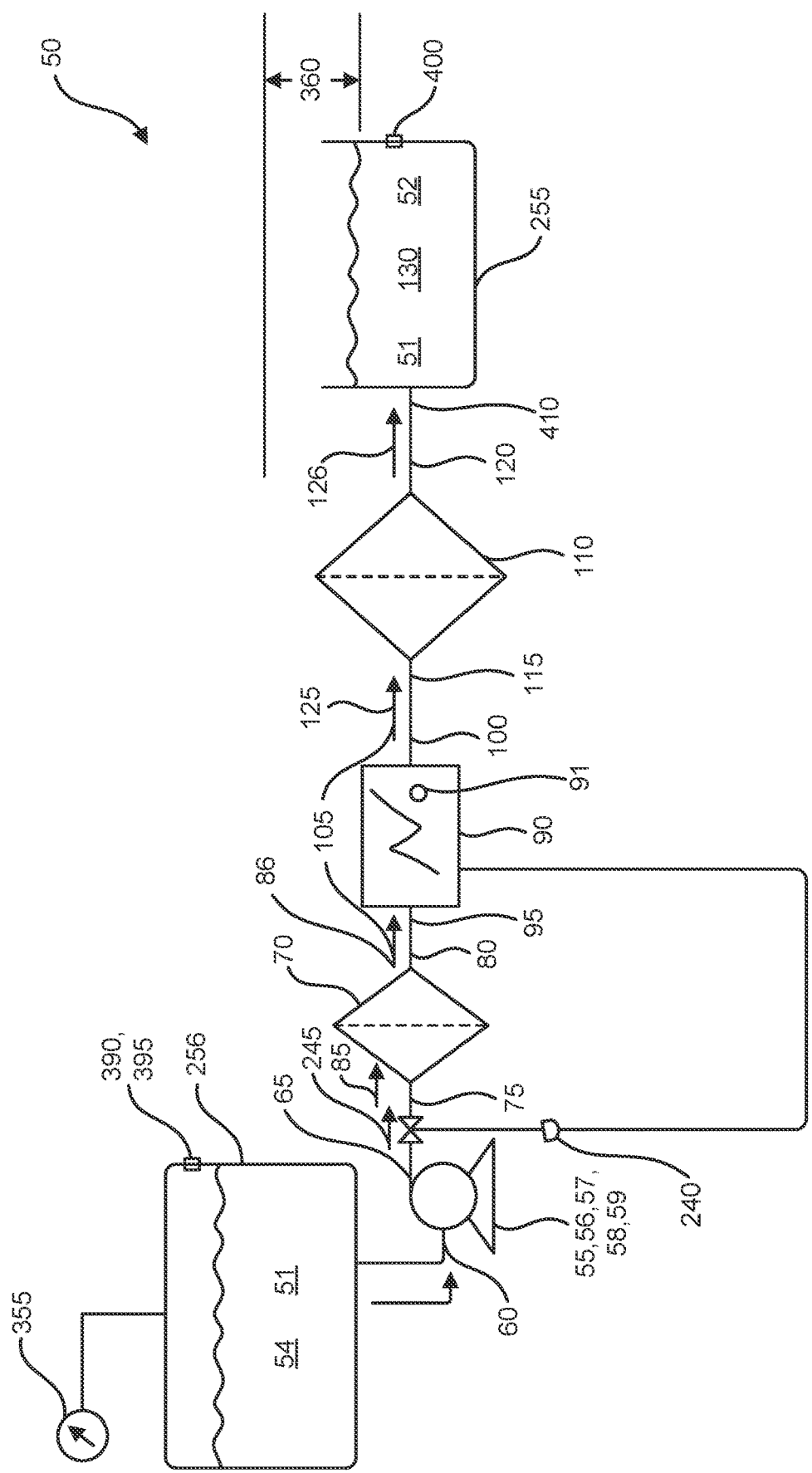
FIG. 6 shows schematic view of the fluid treatment system that includes the untreated fluid in the untreated reservoir communicating to the means for moving the fluid, a primary fluid filter, communicating to a primary ultralight module communicating to a secondary fluid filter that in turn communicates to a treated fluid reservoir containing the first treated fluid, further shown is a means for controlling fluid flowrate and a pressurized untreated fluid reservoir.

Continuing, FIG. 6 shows schematic view of the fluid treatment system 50 that includes the untreated fluid 54 in the untreated reservoir 256 communicating to the means 55 for moving the fluid 51, the primary fluid filter 70, communicating 86 to the primary ultraviolet light module 90 communicating 125 to the secondary fluid filter 110 that in turn communicates 126 to the treated fluid reservoir 255 containing the first treated fluid 130, further shown is a means 240 for controlling fluid 51 flowrate and an optional pressurized untreated fluid reservoir 256.

Next, FIG. 7 shows schematic view of the fluid treatment system 50 that includes the untreated fluid 54 in the untreated reservoir 254 communicating to the means 55 for moving the fluid 51, the primary fluid filter 70, communicating 86 to the primary ultraviolet light module 90 communicating 125 to the secondary fluid filter 110 that in turn communicates 260 to the treated fluid reservoir 255 containing the first treated fluid 130, further shown is a fluid level control structure 265 with a first aperture 270.

Figure 8:
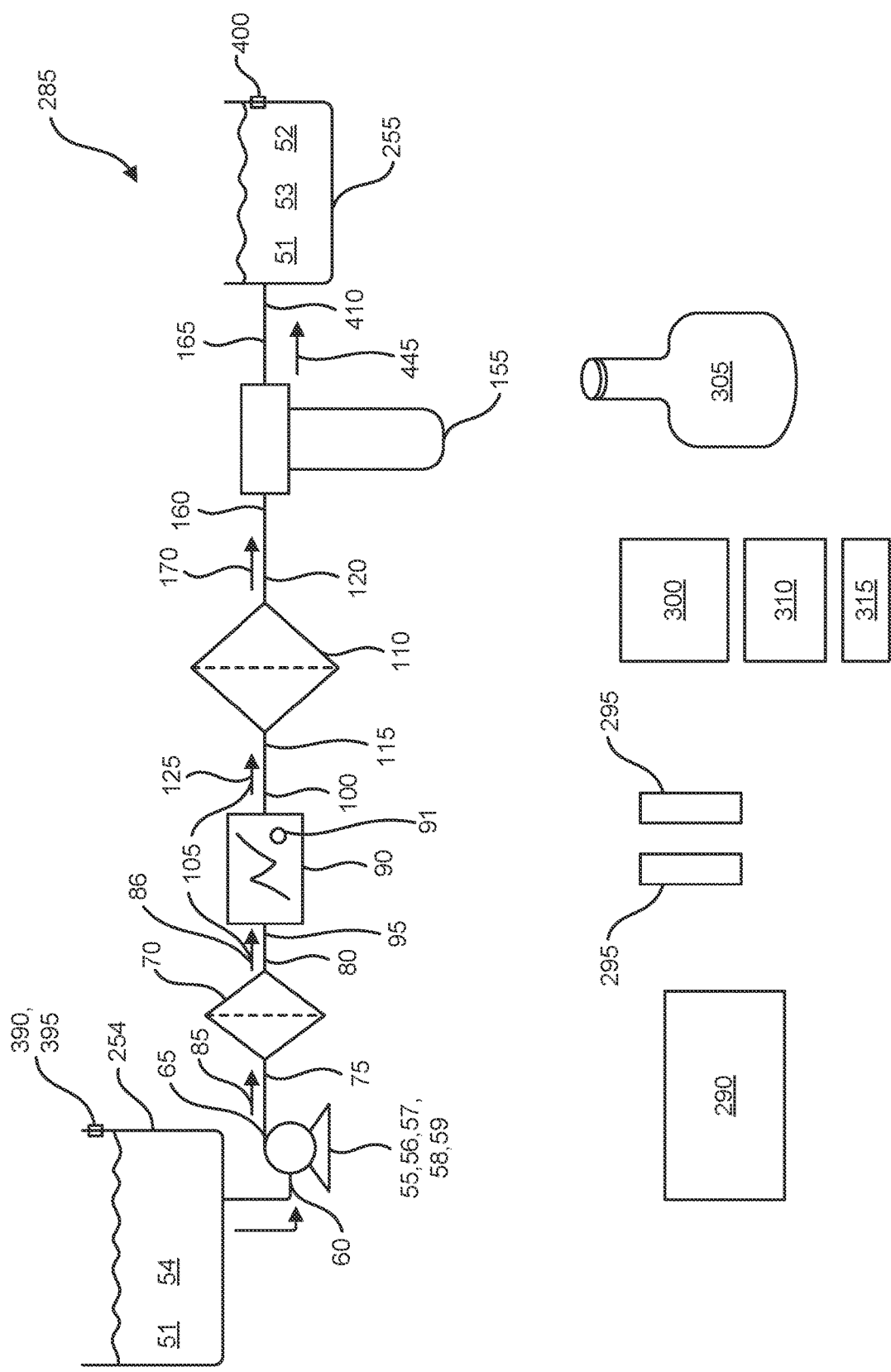
FIG. 8 shows schematic view of the fluid treatment system that includes the untreated fluid in the untreated reservoir communicating to the means for moving the fluid, a primary fluid filter, communicating to a primary ultralight module communicating to a secondary fluid filter, communicating to an activated charcoal filter that in turn communicates to a treated fluid reservoir containing the second treated fluid, further showing a chlorine test kit, test strips, instructions, and bleach.

Further, FIG. 8 shows schematic view of the fluid treatment system 50 that includes the untreated fluid 54 in the untreated reservoir 254 communicating to the means 55 for moving the fluid 51, the primary fluid filter 70, communicating 86 to the primary ultraviolet light module 90 communicating 125 to the secondary fluid filter 110, communicating 170 to the activated charcoal filter 155 that in turn communicates 445 to the treated fluid reservoir 255 containing a second treated fluid 53, further showing a chlorine test kit 290, test strips 295, instructions 300, 310, and bleach 305.

Figure 9:
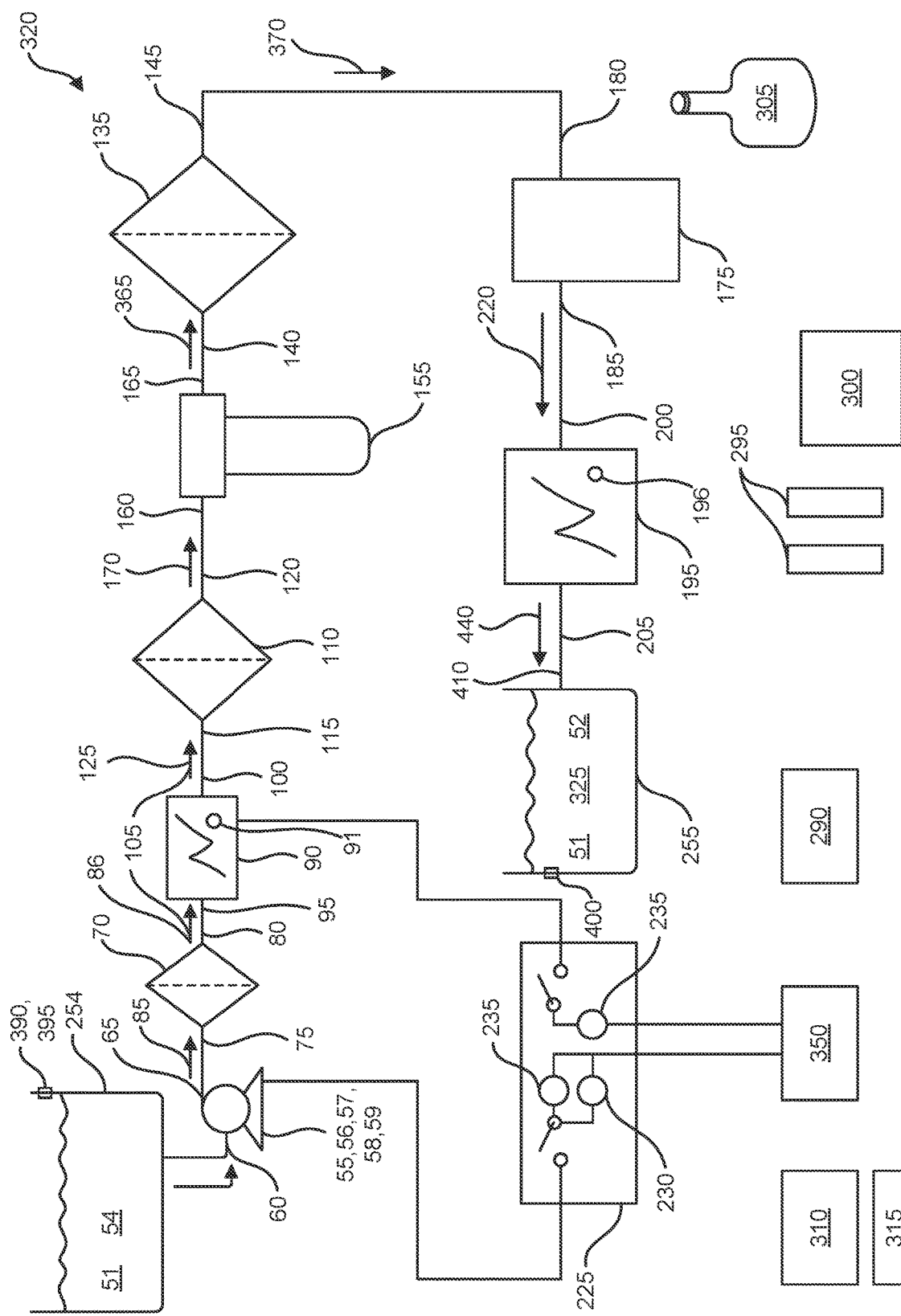
FIG. 9 shows schematic view of the fluid treatment system that includes the untreated fluid in the untreated reservoir communicating to the means for moving the fluid, a primary fluid filter, communicating to a primary ultraviolet light module communicating to a secondary fluid filter, communicating to an activated charcoal filter that communicates to the tertiary fluid filter that communicates to an ion exchange filter, that communicates to a secondary ultraviolet light module, that in turn communicates to a treated fluid reservoir containing the third treated fluid, further showing a chlorine test kit, test strips, instructions, with bleach, and further shown is control circuitry that effectuates the first selected time delay period that activate the primary ultraviolet light module prior to allowing activation of the means for moving the fluid.

Continuing, FIG. 9 shows schematic view of the fluid treatment system 50 that includes the untreated fluid 54 in the untreated reservoir 254 communicating to the means 55 for moving the fluid 51, the primary fluid filter 70, communicating 86 to the primary ultraviolet light module 90 communicating 125 to the secondary fluid filter 110, communicating 170 to the activated charcoal filter 155 that communicates 365 to the tertiary fluid filter 135 that communicates 370 to the ion exchange filter 175, that communicates 220 to the secondary ultraviolet light module 195, that in turn communicates 440 to the treated fluid reservoir 255 containing the third treated fluid 325, further showing the chlorine test kit 290, test strips 295, instructions 300, 310 with bleach 305, and further shown is control circuitry 225 that effectuates the first selected time delay period 230 that activates the primary ultraviolet light module 90 prior to allowing activation of the means 55 for moving the fluid 51.

Further, FIG. 10 shows cross section view 10-10 from FIG. 7, wherein FIG. 10 shows the treated fluid 52 reservoir 255 containing the treated fluid 52, further shown is a fluid level control structure 265 affixed 505 to the surrounding sidewall 280 of the treated fluid reservoir 255 and further the fluid level control structure 265 affixed 535 to the closed channel fluid communication 530 to the flanged in-line gate valved 525 first aperture 270 affixed therethrough the surrounding sidewall 280 of the treated fluid reservoir 255.

Figure 11:
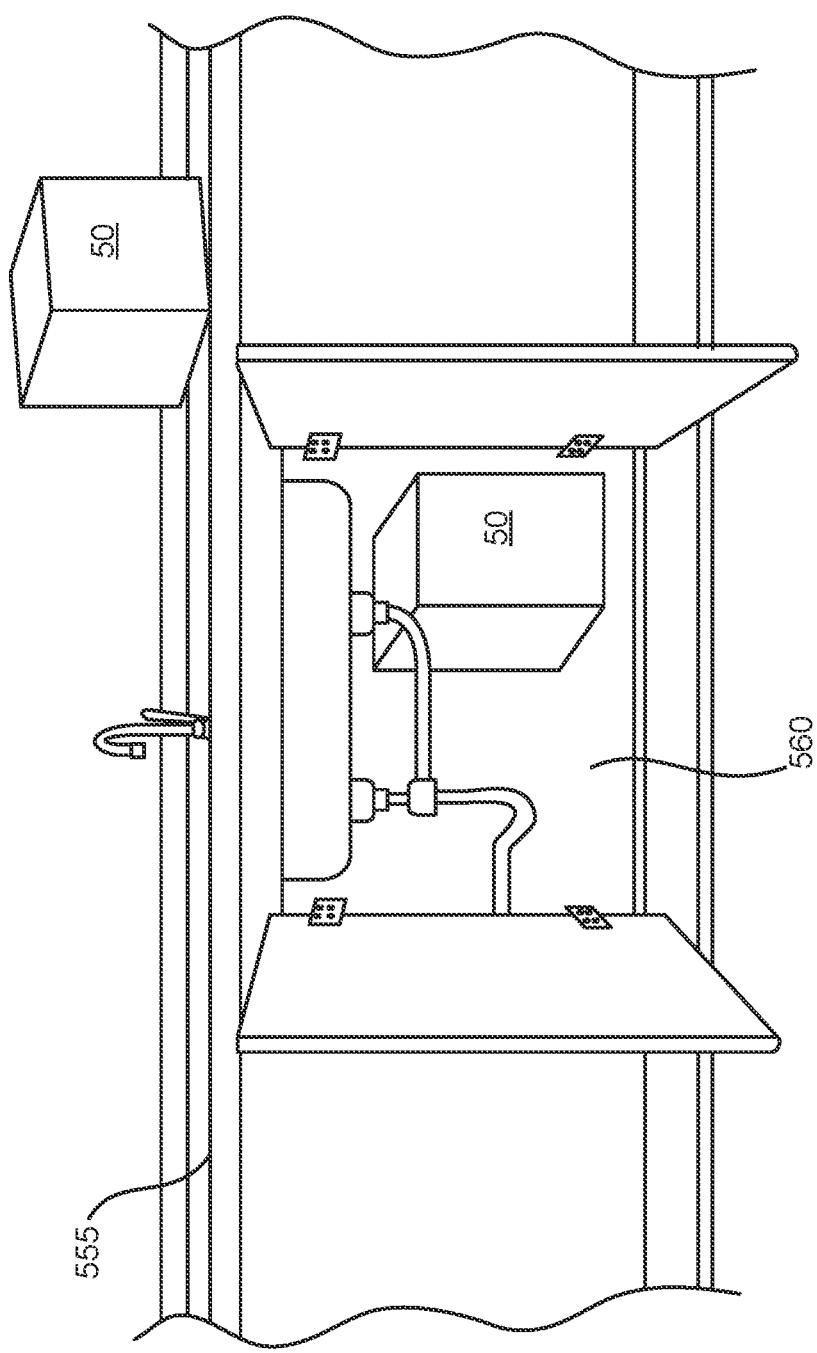
FIG. 11 shows an installed use view of the fluid treatment system installed in either an over or under counter position in a self-contained manner to provide auxiliary water treatment for the home user.

Continuing, FIG. 11 shows an installed use view of the fluid treatment system 50 installed in either an over 555 or under 560 counter position in a self-contained manner to provide auxiliary water treatment for the home user.

Broadly in looking at FIG. 1, the present invention is the fluid treatment system 50 for treating the fluid 51, the fluid treatment system 50 including the means 55 for moving the fluid 51 therethrough the fluid treatment system 50, the means 55 for moving the fluid 51 including a first inlet 60 and a first outlet 65, further the primary fluid filter 70 having a primary fluid filter inlet 75 and a primary fluid filter outlet 80, wherein the primary fluid filter 70 inlet 75 is in fluid communication 85 with the first outlet 65. Further included with the fluid treatment system 50 is a primary ultraviolet light module 90 having a primary ultraviolet light module 90 inlet 95 and a primary ultraviolet light module 90 outlet 100, wherein the primary ultraviolet light module 90 inlet 95 is in fluid communication 86 with the primary fluid filter 70 outlet 80, also the primary ultraviolet light module 90 can include a perceptible output 91 to indicate an activated state being audible, visual, remote indication, or the like. Further, a secondary fluid filter 110 having a secondary fluid filter inlet 115 and a secondary fluid filter 110 outlet 120, wherein the secondary fluid filter 110 inlet 115 is in fluid communication 125 with the primary ultraviolet light module 90 outlet 100, wherein the secondary fluid filter 110 outlet 120 discharges a first treated fluid 130 into the treated fluid 52 reservoir 255.

The means 55 for moving the fluid 51 can be a pump/motor combination 56, or be a manual pump 57 (hand, bellows, siphon bulb, peristaltic type, or piston—for example syringe type). Alternatively, for the means 55, 58, 59 for moving the fluid 51 through the fluid treatment system 50 can be structural elevation differences 360 as shown in FIG. 6, and fluid treatment system optional pressure differences 355 optionally having a higher pressure untreated fluid reservoir 256 in relation to an optional lower pressure treated fluid reservoir 255, see FIG. 6.

On the fluid filters the preferred filtration ranges are;
Primary fluid filter 70 being less than or equal to fifty micrometers.
Secondary fluid filter 110 being less than or equal to ten micrometers.
Tertiary fluid filter 135 being less than or equal to ten micrometers.
Fourth fluid filter 405 being less than or equal to ten micrometers.
As a non-limiting example of a staging sequence of filtration would be;
Primary fluid filter 70 being fifty micrometers for coarse particulates.
Secondary fluid filter 110 being ten micrometers.
Tertiary fluid filter 135 being three micrometers.
Fourth fluid filter 405 being zero point four five micrometers for bacteria.

Looking at FIG. 2 for the fluid treatment system 50 there can be a tertiary fluid filter 135 having a tertiary fluid filter 135 inlet 140 and a tertiary fluid filter 135 outlet 145, wherein the tertiary fluid filter 135 inlet 140 is in fluid communication 150 with the secondary fluid filter 110 outlet 120.

Looking at FIG. 3 for the fluid treatment system 50 there can be an activated carbon absorption fluid filter 155 having an activated carbon absorption fluid filter 155 inlet 160 and an activated carbon absorption fluid filter 155 outlet 165, wherein the activated carbon absorption fluid filter 155 inlet 160 is in fluid communication 170 with the secondary fluid filter 110 outlet 120.

Looking at FIG. 4 for the fluid treatment system 50 there can be an ion exchange fluid filter 175 having an ion exchange fluid filter 175 inlet 180 and an ion exchange fluid filter 175 outlet 185, wherein the ion exchange fluid filter 175 inlet 180 is in fluid communication 190 with the secondary fluid filter 110 outlet 120.

Looking at FIGS. 2, 3, 4, and 9 for the fluid treatment system according there can be a secondary ultraviolet light module 195 having a secondary ultraviolet light module 195 inlet 200 and a secondary ultraviolet light module 195 outlet 205, wherein the secondary ultraviolet light module 195 inlet 200 is in fluid communication 210 with the tertiary fluid filter 135 outlet 145, also the secondary ultraviolet light module 195 can include a perceptible output 196 to indicate an activated state being audible, visual, remote indication, or the like. The secondary ultraviolet light module 105 outlet 205 is in fluid communication 430 the fourth fluid filter 405 having inlet 420, wherein the fourth fluid filter 405 outlet 425 is in communication 435 to the inlet 410 of the treated fluid reservoir 255 containing a fourth treated fluid 375, see FIG. 2.

Again looking at FIG. 3 for the fluid treatment system 50 can further comprise a secondary ultraviolet light module 195 having the secondary ultraviolet light 195 module inlet 200 and the secondary ultraviolet light module 195 outlet 205, wherein the secondary ultraviolet light module 195 inlet 200 is in fluid communication 215 with the activated carbon absorption fluid filter 155 outlet 165, wherein the secondary ultraviolet light module 195 outlet 205 through fluid communication 440 to the inlet 410 of the treated fluid reservoir 255 discharges a fifth treated fluid 380.

Looking at FIG. 4 for the fluid treatment system 50 can further comprising the secondary ultraviolet light module 195 having the secondary ultraviolet light module 195 inlet 200 and the secondary ultraviolet light module 195 outlet 205, wherein the secondary ultraviolet light module 195 inlet 200 is in fluid communication 220 with the ion exchange fluid filter 175 outlet 185, wherein the secondary ultraviolet light module 195 outlet 205 discharges a sixth treated fluid 385 via fluid communication 440 to the inlet 410 of the treated fluid reservoir 255.

Looking at FIGS. 5 and 9, for the fluid treatment system 50 that can further comprise control circuitry 225 that effectuates the first selected time delay period 230 that activates the primary ultraviolet light module 90 (and secondary ultraviolet light module 195 in FIG. 9) for the first selected time delay period 230 prior to allowing activation of the means 55 for moving the fluid 51 therethrough the fluid treatment system 50. Continuing, for the fluid treatment system 50 the control circuitry 225 can further include a second selected time period 235 that deactivates the means 55 for moving the fluid 51 therethrough the fluid treatment system 50 and the primary ultraviolet light module 90 subsequent to activation of the means 55 for moving the fluid 51 therethrough to limit the fluid treatment system to a batch processing of the fluid 51.

Looking at FIG. 6 for the fluid treatment system 50 can further comprise a means 240 for controlling a flow rate of the fluid 51 emanating from the means 55 for moving the fluid 51 therethrough the fluid treatment system 50, wherein the means 240 for controlling the flow rate of the fluid 51 is in fluid communication 245 with the first outlet 65, wherein operationally the means 240 for controlling a flow rate of the fluid 51 includes circuitry to set a dwell time 250 of the fluid 51 being exposed to the primary ultraviolet light module 90.

Looking at FIGS. 7 and 10 for the fluid treatment system 50 can further comprise the treated fluid reservoir 255 inlet 410 that is in fluid communication 260 with the secondary fluid filter 110 outlet 120, wherein the treated fluid reservoir 255 can include a fluid level 275 control structure 265 disposed within the treated fluid reservoir 255 to divert the treated fluids 53, 130, 325, 375, 380, or 385 above a selected level therethrough a first aperture 270 disposed within and therethrough a surrounding sidewall 280 of the treated fluid reservoir 255, wherein operationally the fluid level control structure 265 actively diverts the treated fluids 53, 130, 325, 375, 380, or 385 away from potentially damaging the means 55 for moving the fluid 51 therethrough the fluid treatment system 50, which can include but is not limited to the primary fluid filter 70, the primary ultraviolet light module 90, and the secondary fluid filter 110.

Looking at FIG. 8 for the fluid treatment system kit 285 for treating the fluid 51, the fluid treatment system kit 285 including a fluid treatment system 50 that includes the means 55 for moving the fluid 51 therethrough the fluid treatment system 50, the means 55 for moving the fluid 51 including the first inlet 60 and the first outlet 65, the primary fluid filter 70 having the primary fluid filter 70 inlet 75 and the primary fluid filter 70 outlet 80, wherein the primary fluid filter 70 inlet 75 is in fluid communication 85 with the first outlet 65. Further included in the primary ultraviolet light module 90 having the primary ultraviolet light module 90 inlet 95 and the primary ultraviolet light module 90 outlet 100, wherein the primary ultraviolet light module 90 inlet 95 is in fluid communication 86 with the primary fluid filter outlet 80, and the secondary fluid filter 110 having the secondary fluid filter 110 inlet 115 and the secondary fluid filter 110 outlet 120, wherein the secondary fluid filter 110 inlet 115 is in fluid communication 125 with the primary ultraviolet light module 90 outlet 100, the activated carbon absorption fluid filter 155 having the activated carbon absorption fluid filter 155 inlet 160 and the activated carbon absorption fluid filter 155 outlet 165, wherein the activated carbon absorption filter 155 inlet 160 is in fluid communication 170 with the secondary fluid filter 110 outlet 120, wherein the activated carbon absorption fluid filter 155 outlet 165 discharges the second treated fluid 53 to the inlet 410 of the treated fluid reservoir 255.

Further included in the fluid treatment system kit 285 is the chlorine disinfectant residual test kit 290 including chlorine test strips 295 and instructions 300 to test for absence of chlorine in the second treated fluid 53 to operationally check the efficacy of the activated carbon absorption fluid filter 155.

Again looking at FIG. 8 for the fluid treatment system kit 285 for treating the fluid 51 can further include bleach 305 and instructions 310 to add, agitate, and have dwell time of additional chlorine from the bleach 305 to the second treated fluid 53 in the event of the primary ultraviolet light module 90 failure, further using the chlorine disinfectant residual test kit 290 including chlorine test strips 295 to test for a desired chlorine level in the second treated fluid 53 and repeating the instructions 310 add, agitate, and have dwell time of additional chlorine to achieve the desired chlorine level in the second treated fluid 53.

Continuing to look at FIG. 8 for the fluid treatment system kit 285 for treating the fluid 51 can further include instructions 315 to test an untreated fluid 54 and the second treated fluid 53, wherein the untreated fluid 54 is directed to the first inlet 60 for determining sizes and criterion of the primary 70 and secondary 110 fluid filters, the primary ultraviolet light module 90, and the activated carbon absorption fluid filter 155, to meet the test instructions 300, 310 for the treated fluids 53, 130, 325, 375, 380, or 385.

Looking at FIG. 9 for the method 320 for treating the fluid 51 in going from an untreated fluid 54 to the third treated fluid 325, including the steps of firstly providing a fluid treatment system 50 that includes the means 55 for moving the fluid 51 therethrough the fluid treatment system 50, the means 55 for moving the fluid 51 including the first inlet 60 and the first outlet 65, the primary fluid filter 70 having the primary fluid filter 70 inlet 75 and the primary fluid filter 70 outlet 80, wherein the primary fluid filter 70 inlet 75 is in fluid communication 85 with the first outlet 65, the primary ultraviolet light module 90 having the primary ultraviolet light module 90 inlet 95 and the primary ultraviolet light module 90 outlet 100. Wherein the primary ultraviolet light module 90 inlet 95 is in fluid communication 86 with the primary fluid filter 70 outlet 80, and the secondary fluid filter 110 having the secondary fluid filter 110 inlet 115 and the secondary fluid filter 110 outlet 120, wherein the secondary fluid filter 110 inlet 115 is in fluid communication 125 with the primary ultraviolet light module 90 outlet 100, the activated carbon absorption fluid filter 155 having an activated carbon absorption fluid filter 155 inlet 160 and an activated carbon absorption fluid filter 155 outlet 165, wherein the activated carbon absorption fluid filter 155 inlet 160 is in fluid communication 170 with the secondary fluid filter 110 outlet 120. The tertiary fluid filter 135 having the tertiary fluid filter 135 inlet 140 and the tertiary fluid filter 135 outlet 145, wherein the tertiary fluid filter 135 inlet 140 is in fluid communication 365 with the activated carbon absorption fluid filter 155 outlet 165, the ion exchange fluid filter 175 having the ion exchange fluid filter 175 inlet 180 and the ion exchange fluid filter 175 outlet 185, wherein the ion exchange fluid filter 175 inlet 180 is in fluid communication 370 with the tertiary fluid filter 135 outlet 145, and the secondary ultraviolet light module 195 having the secondary ultraviolet light module 195 inlet 200 and the secondary ultraviolet light module 195 outlet 205, wherein the secondary ultraviolet light module 195 inlet 200 is in fluid communication 220 with the ion exchange fluid filter 175 outlet 185, wherein the secondary ultraviolet light module 195 outlet 205 discharges the third treated fluid 325 to the inlet 410 of the treated fluid reservoir 255 via fluid communication 440.

Secondly providing control circuitry 225 that effectuates the first selected time delay period 230 that activates the primary ultraviolet light module 90 and the secondary ultraviolet light module 195 for the first selected time delay period 230 prior to allowing activation of the means 55 for moving the fluid 51 therethrough the fluid treatment system 50 and thirdly activating the control circuitry 225 to initiate the first selected time delay period 230. Fourth a step of activating the means 55 for moving the fluid 51 therethrough the fluid treatment system 50.

Continuing with FIG. 9 for the method 320 for treating the fluid 51 in going from the untreated fluid 54 to the third treated fluid 325 optionally further adding the steps of providing and activating the control circuitry 225 that further includes the second selected time period 235 that deactivates the means 55 for moving the fluid 51 therethrough the fluid treatment system 50 and primary ultraviolet light module 90 subsequent to activation of the means 55 for moving the fluid 51 therethrough to limit the fluid treatment system 50 to a batch processing of the fluid 51.

Further, continuing with FIG. 9 for the method 320 for treating the fluid 51 in going from the untreated fluid 54 to the third treated fluid 325 further adding the steps of providing the chlorine disinfectant residual test kit 290 including chlorine test strips 295 and providing chlorine test instructions 300 and executing the chlorine test instructions 300 to test for absence of chlorine in the third treated fluid 325 to operationally check the efficacy of the activated carbon absorption filter 155.

Again continuing with FIG. 9 for the method 320 for treating the fluid 51 in going from an untreated fluid 54 to the third treated fluid 325 further adding the steps of providing bleach 305 and providing and executing instructions 310 to add, agitate, and have dwell time of additional chlorine from the bleach 305 to the third treated fluid 325 in the event of the primary 90 and secondary 195 ultraviolet light modules failing, further using the chlorine disinfectant residual test kit 290 including chlorine test strips 295 to test for a desired chlorine level in the third treated fluid 325 and repeating the instructions 310 to add, agitate, and have dwell time of additional chlorine to achieve the desired chlorine level in the third treated fluid 325.

Also, continuing with FIG. 9 for the method 320 for treating the fluid 51 in going from the untreated fluid 54 to the third treated fluid 325 further adding the steps of providing and executing instructions 315 to test the untreated fluid 54 and the third treated fluid 325, wherein the untreated fluid 54 is directed to the first inlet 60, the instructions 315 to test the untreated fluid 54 and the third treated fluid 325 are for determining sizes and criterion of the primary 70, secondary 110, and tertiary 135 fluid filters, the primary 90 and secondary 195 ultraviolet light modules, the activated carbon absorption fluid filter 155, and the ion exchange fluid filter 175 to meet the test instruction 315 for the third treated fluid 325.

The present invention system 50 is designed to produce potable water 52 and can use a twelve volt power source 350, or other "safe" low voltage, and highly filtered water 52 through the use of a syringe 57 as a power source even in the event of the failure of the system's twelve volt pump 55 and UV portions 90, 195. As long as one of the four available filter cartridges 70, 110, 135, 405 employs a <0.45 um filter (typically the last stage of filtration), pathogenic bacteria (along with the viruses typically attached to each bacteria) should be physically excluded. The syringe 57 connection/quick disconnect at the discharge from the untreated fluid reservoir 254 is followed by preferably a twelve V DC centrifugal pump 56 upstream of a means 240 for flow control, that can be an orifice plate or short length of small diameter tubing, engineered to ensure adequate contact time for UV 90, 195 disinfection, as well as adequate contact time for effective GAC adsorption 155 and/or ion exchange 175. A preferred example but non-limiting single embodiment description of the present invention fluid treatment system 50 in referring to FIGS. 1 to 11 follows;

Reservoir for untreated fluid 254 at atmospheric pressure dimensioned at about 13"W×5"D×7"H, containing about 2 gallons, the reservoir 254 having a quick disconnect fitting 390, 395 (to allow direct connection to the municipal water supply or for use as a syringe pump 57 connection when the pump 56 fails, or in emergency situations. The means 55 for moving the fluid 51 that can include the a means 240 for flow control as previously described followed by the primary fluid filter 70 at less than or equal ≤ to about 50.0 um to remove relatively large particles which can shield pathogens from ultraviolet light disinfection 90, 195. Continuing to the first stage UV disinfection or primary ultraviolet light module 90 that preferably uses any UV system which can meet EPA standards for microbial inactivation and subsequent use as potable water is acceptable, (for example: Technologies which provide a "contact chamber" on either side of a single lamp, a reflective surface (ref. 7252763 Keunnen), being two side by side contact tubes wrapped around a single lamp, or those that employ separate UV lamps and contact chambers for pre-disinfection and post disinfection), and that depending on the existing technologies employed, the second stage or secondary UV module 195 may use the same UV source as the first stage UV disinfection or primary ultraviolet light module 90. Please note that to gain EPA acceptance, the system includes filtration which will provide adequate particle removal to ensure that pathogens cannot be occluded and thereby avoid adequate contact with the UV lamps 90, 195.

Further on the primary 90 and secondary 195 ultraviolet light modules there can be control circuitry 225 that has a first time delay 230 is included in the fluid treatment system 50 controller which delays the pump 56 start until the primary 90 and secondary 195 ultraviolet light modules power source is at greater than or equal to ≥40,000 microwatt-sec/sq. cm., the system controller circuitry 225 also includes the second time delay 235 which shuts off the fluid treatment system 50 including the pump 56 after "X" (variable) seconds that is determined by a specific application of the fluid treatment system 50 in the instructions 300 (guidance will be included that those who choose to install the system under the counter or teed from the sink faucet) and pipe it to a dedicated faucet such that to extend the life of the primary 90 and secondary 195 ultraviolet light modules, that about 1-2 gallons be collected from the dedicated faucet each time a momentary pump 56 switch is activated)

The $1^{st}$, $2^{nd}$, $3^{rd}$, & $4^{th}$ fluid filters being respectively the primary fluid filter 70, the secondary fluid filter 110, the tertiary fluid filter 135, and the fourth fluid filter 405 plus carbon adsorption filter 155, and/or ion exchange filter 175, respectively; preferably the tertiary fluid filter 135, and the fourth fluid filter 405 plus carbon adsorption filter 155, and/or ion exchange filter 175 are all three are at less than or equal ≤ to about 10.0 micron and may be in descending sizes.

The reservoir for treated fluid 255 can include the quick disconnect fitting 400 for those wishing to connect the system to a dedicated faucet at the sink it is attached to the reservoir for treated fluid 255.

CONCLUSION

Accordingly, the present invention of a fluid treatment system has been described with some degree of particularity directed to the embodiments of the present invention. It should be appreciated, though; that the present invention is defined by the following claims construed in light of the prior art so modifications of the changes may be made to the exemplary embodiments of the present invention without departing from the inventive concepts contained therein.

The invention claimed is:

1. A fluid treatment system for treating a fluid, said fluid treatment system comprising:
   (a) a means for moving a fluid therethrough said fluid treatment system, said means for moving a fluid including a first inlet and a first outlet;
   (b) a primary fluid filter having a primary fluid filter inlet and a primary fluid filter outlet, wherein said primary fluid filter inlet is in fluid communication with said first outlet;

(c) a primary ultraviolet light module having a primary ultraviolet light module inlet and a primary ultraviolet light module outlet, wherein said primary ultraviolet light module inlet is in fluid communication with said primary fluid filter outlet;

(d) a secondary fluid filter having a secondary fluid filter inlet and a secondary fluid filter outlet, wherein said secondary fluid filter inlet is in fluid communication with said primary ultraviolet light module outlet, wherein said secondary fluid filter outlet discharges a first treated fluid; and (e) a treated fluid reservoir that is in fluid communication with said secondary fluid filter outlet, wherein said treated fluid reservoir includes an affixed fluid level control structure disposed within said treated fluid reservoir, wherein said fluid level control structure is affixed to said treated fluid reservoir, further said fluid level control structure is submerged below positionally a selected fluid level in said treated fluid reservoir, wherein said fluid level control structure is affixedly connected to and in a closed channel fluid communication with an in-line gate valved first aperture, wherein said in-line gate valved first aperture is positioned below said selected fluid level, wherein said in-line gate valved first aperture is submerged below said selected fluid level and affixed within and therethrough a vertical surrounding sidewall of said treated fluid reservoir, wherein said selected fluid level is below a maximum fluid level of said treated fluid reservoir to divert the treated fluid above a selected level therethrough said in-line gate valved first aperture, wherein operationally said fluid level control structure actively diverts the treated fluid at a position below the maximum fluid level of the treated fluid reservoir away from potentially damaging said means for moving a fluid therethrough said fluid treatment system, said primary fluid filter, said primary ultraviolet light module, and said secondary fluid filter, said fluid treatment system is sized and self-contained for over or under countertop placement.

2. A fluid treatment system according to claim 1 further comprising control circuitry that effectuates a first selected time delay period that activates said primary ultraviolet light module for said first selected time delay period prior to allowing activation of said means for moving a fluid therethrough said fluid treatment system.

3. A fluid treatment system according to claim 2 wherein said control circuitry further includes a second selected time period that deactivates said means for moving a fluid therethrough said fluid treatment system and said primary ultraviolet light module subsequent to activation of said means for moving a fluid therethrough to limit said fluid treatment system to a batch processing of the fluid.

4. A fluid treatment system according to claim 1 further comprising a means for controlling a flow rate of the fluid emanating from said means for moving a fluid therethrough said fluid treatment system, wherein said means for controlling a flow rate of the fluid is in fluid communication with said first outlet, wherein operationally said means for controlling a flow rate of the fluid includes circuitry to set a dwell time of the fluid being exposed to said primary ultraviolet light module.

5. A fluid treatment system according to claim 4 wherein said means for moving a fluid therethrough said fluid treatment system is selected from the group consisting of: pump/motor combinations, manual pumps, fluid treatment system structural elevation differences, and fluid treatment system pressure differences.

6. A fluid treatment system kit for treating a fluid, said fluid treatment system kit comprising:

(a) a fluid treatment system that includes a means for moving a fluid therethrough said fluid treatment system, said means for moving a fluid including a first inlet and a first outlet, a primary fluid filter having a primary fluid filter inlet and a primary fluid filter outlet, wherein said primary fluid filter inlet is in fluid communication with said first outlet, a primary ultraviolet light module having a primary ultraviolet light module inlet and a primary ultraviolet light module outlet, wherein said primary ultraviolet light module inlet is in fluid communication with said primary fluid filter outlet, and a secondary fluid filter having a secondary fluid filter inlet and a secondary fluid filter outlet, wherein said secondary fluid filter inlet is in fluid communication with said primary ultraviolet light module outlet, an activated carbon absorption fluid filter having an activated carbon absorption fluid filter inlet and an activated carbon absorption fluid filter outlet, wherein said activated carbon absorption filter inlet is in fluid communication with said secondary fluid filter outlet, wherein said activated carbon absorption fluid filter outlet discharges a treated fluid, and a treated fluid reservoir that is in fluid communication with said activated carbon absorption fluid filter outlet, wherein said treated fluid reservoir includes an affixed fluid level control structure disposed within said treated fluid reservoir, wherein said fluid level control structure is affixed to said treated fluid reservoir, further said fluid level control structure is submerged below positionally a selected fluid level in said treated fluid reservoir, wherein said fluid level control structure is affixedly connected to and in a closed channel fluid communication with an in-line gate valved first aperture that is positioned below said selected fluid level, wherein said in-line gate valved first aperture is submerged below said selected fluid level and affixed within and therethrough a vertical surrounding sidewall of said treated fluid reservoir, wherein said selected fluid level is below a maximum fluid level of said treated fluid reservoir to divert the treated fluid above a selected level therethrough said in-line gate valved first aperture, wherein operationally said fluid level control structure actively diverts the treated fluid at a position below said maximum fluid level of said treated fluid reservoir away from potentially damaging said means for moving a fluid therethrough said fluid treatment system, said primary fluid filter, said primary ultraviolet light module, said secondary fluid filter, and said activated carbon absorption fluid filter, said fluid treatment system is sized and self-contained for over or under countertop placement;

(b) a chlorine disinfectant residual test kit including chlorine test strips; and (c) instructions to test for absence of chlorine in the treated fluid to operationally check the efficacy of said activated carbon absorption fluid filter.

7. A fluid treatment system kit for treating a fluid according to claim 6 further including bleach and instructions to add, agitate, and have dwell time of additional chlorine from said bleach to said treated fluid in the event of said primary ultraviolet light module failure, further using said chlorine disinfectant residual test kit including chlorine test strips to test for a desired chlorine level in said treated fluid and repeating said instructions to add, agitate, and have dwell time of additional chlorine to achieve said desired chlorine level in said treated fluid.

8. A fluid treatment system kit for treating a fluid according to claim 6 further including instructions to test an untreated fluid and said treated fluid, wherein said untreated fluid is directed to said first inlet for determining sizes and criterion of said primary and secondary fluid filters, said primary ultraviolet light module, and said activated carbon absorption fluid filter, to meet said test instruction for said treated fluid.

9. A method for treating a fluid in going from an untreated fluid to a treated fluid, comprising the steps of:
(a) providing a fluid treatment system that includes a means for moving a fluid therethrough said fluid treatment system, said means for moving a fluid including a first inlet and a first outlet, a primary fluid filter having a primary fluid filter inlet and a primary fluid filter outlet, wherein said primary fluid filter inlet is in fluid communication with said first outlet, a primary ultraviolet light module having a primary ultraviolet light module inlet and a primary ultraviolet light module outlet, wherein said primary ultraviolet light module inlet is in fluid communication with said primary fluid filter outlet, and a secondary fluid filter having a secondary fluid filter inlet and a secondary fluid filter outlet, wherein said secondary fluid filter inlet is in fluid communication with said primary ultraviolet light module outlet, an activated carbon absorption fluid filter having an activated carbon absorption fluid filter inlet and an activated carbon absorption fluid filter outlet, wherein said activated carbon absorption fluid filter inlet is in fluid communication with said secondary fluid filter outlet, a tertiary fluid filter having a tertiary fluid filter inlet and a tertiary fluid filter outlet, wherein said tertiary fluid filter inlet is in fluid communication with said activated carbon absorption fluid filter outlet, an ion exchange fluid filter having an ion exchange fluid filter inlet and an ion exchange fluid filter outlet, wherein said ion exchange fluid filter inlet is in fluid communication with said tertiary fluid filter outlet, and a secondary ultraviolet light module having a secondary ultraviolet light module inlet and a secondary ultraviolet light module outlet, wherein said secondary ultraviolet light module inlet is in fluid communication with said ion exchange fluid filter outlet, wherein said secondary ultraviolet light module outlet discharges the treated fluid, and a treated fluid reservoir that is in fluid communication with said secondary ultraviolet light module outlet, wherein said treated fluid reservoir includes an affixed fluid level control structure disposed within said treated fluid reservoir, wherein said fluid level control structure is affixed to said treated fluid reservoir, further said fluid level control structure is submerged below positionally a selected fluid level in said treated fluid reservoir, wherein said fluid level control structure is affixedly connected to and in a closed channel fluid communication with an in-line gate valved first aperture that is positioned below said selected fluid level, wherein said in-line gate valved first aperture is submerged below said selected fluid level and affixed within and therethrough a vertical surrounding sidewall of said treated fluid reservoir, wherein said selected fluid level is below a maximum fluid level of said treated fluid reservoir to divert the treated fluid above a selected level therethrough said in-line gate valved first aperture, wherein operationally said fluid level control structure actively diverts the treated fluid at a position below said maximum fluid level of said treated fluid reservoir away from potentially damaging said means for moving a fluid therethrough said fluid treatment system, said primary fluid filter, said primary ultraviolet light module, said secondary fluid filter, said activated carbon absorption fluid filter, said tertiary fluid filter, said ion exchange fluid filter, and said secondary ultraviolet light module, said fluid treatment system is sized and self-contained for over or under countertop placement;
(b) providing control circuitry that effectuates a first selected time delay period that activates said primary ultraviolet light module for said first selected time delay period prior to allowing activation of said means for moving a fluid therethrough said fluid treatment system;
(c) activating said control circuitry to initiate said first selected time delay period; and
(d) activating said means for moving a fluid therethrough said fluid treatment system.

10. A method for treating a fluid in going from an untreated fluid to a treated fluid according to claim 9 further adding the steps of providing and activating said control circuitry that further includes a second selected time period that deactivates said means for moving a fluid therethrough said fluid treatment system and primary ultraviolet light module subsequent to activation of said means for moving a fluid therethrough to limit said fluid treatment system to a batch processing of the fluid.

11. A method for treating a fluid in going from an untreated fluid to a treated fluid according to claim 9 further adding the steps of providing a chlorine disinfectant residual test kit including chlorine test strips and providing chlorine test instructions and executing said chlorine test instructions to test for absence of chlorine in the treated fluid to operationally check the efficacy of said activated carbon absorption filter.

12. A method for treating a fluid in going from an untreated fluid to a treated fluid according to claim 11 further adding the steps of providing a bleach and providing or executing instructions to add, agitate, and have dwell time of additional chlorine from said bleach to said treated fluid in the event of said primary or secondary ultraviolet light modules failing, further using said chlorine disinfectant residual test kit including chlorine test strips to test for a desired chlorine level in said treated fluid and repeating said instructions to add, agitate, and have dwell time of additional chlorine to achieve said desired chlorine level in said treated fluid.

13. A method for treating a fluid in going from an untreated fluid to a treated fluid according to claim 9 further adding the steps of providing and executing instructions to test the untreated fluid and the treated fluid, wherein the untreated fluid is directed to said first inlet, said instructions to test the untreated fluid and the treated fluid are for determining sizes and criterion of said primary, secondary, and tertiary fluid filters, said primary and secondary ultraviolet light modules, said activated carbon absorption fluid filter, and said ion exchange fluid filter to meet said test instruction for said treated fluid.

* * * * *